United States Patent
Joo et al.

(10) Patent No.: US 7,883,257 B2
(45) Date of Patent: Feb. 8, 2011

(54) OPTICAL FILM AND DISPLAY DEVICE HAVING THE SAME

(75) Inventors: Hanbitt Joo, Gimpo-si (KR); Kwangwon Lee, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 11/972,473

(22) Filed: Jan. 10, 2008

(65) Prior Publication Data
US 2008/0225530 A1 Sep. 18, 2008

(30) Foreign Application Priority Data
Mar. 16, 2007 (KR) .............. 10-2007-0026168
Mar. 16, 2007 (KR) .............. 10-2007-0026201

(51) Int. Cl.
F21V 7/04 (2006.01)

(52) U.S. Cl. ............ 362/627; 362/606; 362/607; 362/626

(58) Field of Classification Search ........ 362/362, 362/606–607, 626–627; 349/64; 359/837
See application file for complete search history.

(56) References Cited

U.S. PATENT DOCUMENTS

| | | | | |
|---|---|---|---|---|
| 5,771,328 A * | 6/1998 | Wortman et al. | ......... | 385/146 |
| 5,919,551 A * | 7/1999 | Cobb et al. | ......... | 428/156 |
| 6,354,709 B1 * | 3/2002 | Campbell et al. | ......... | 362/627 |
| 2005/0142302 A1 * | 6/2005 | Nakamura | ......... | 428/1.2 |
| 2005/0207035 A1 * | 9/2005 | Nagao | ......... | 359/831 |
| 2006/0109687 A1 | 5/2006 | Campbell | | |
| 2006/0239008 A1 * | 10/2006 | Kim et al. | ......... | 362/330 |

FOREIGN PATENT DOCUMENTS

| | | |
|---|---|---|
| CN | 1788231 A | 6/2006 |
| CN | 1841151 A | 10/2006 |
| CN | 1869788 A | 11/2006 |
| JP | 2006-276621 A | 10/2006 |
| KR | 10-2003-0011648 A | 2/2003 |
| KR | 100432347 B1 | 5/2004 |
| KR | 10-2005-0092257 A | 9/2005 |
| KR | 10-2006-0047789 A | 5/2006 |
| KR | 10-2006-0104639 A | 10/2006 |
| KR | 10-2006-0107457 A | 10/2006 |
| KR | 10-2006-0122138 A | 11/2006 |
| KR | 10-2006-0124068 A | 12/2006 |
| KR | 10-2007-0012198 A | 1/2007 |
| KR | 10-2007-0084410 A | 8/2007 |

* cited by examiner

Primary Examiner—Sandra L O Shea
Assistant Examiner—Meghan K Dunwiddie
(74) Attorney, Agent, or Firm—Birch, Stewart, Kolasch & Birch, LLP (57) ABSTRACT

An optical film and a display device having the same are disclosed. The display device comprises a display panel including a plurality of subpixels and an optical film disposed at one side of the display panel, the optical film includes a base film and a plurality of prisms, wherein a bias angle between a long axis direction of the subpixels and a longitudinal direction of the prisms is substantially 2 to 88 degrees.

24 Claims, 6 Drawing Sheets

Fig. 1

RELATED ART

OPTICAL FILM AND DISPLAY DEVICE HAVING THE SAME

This application claims the benefit of Korean Patent Application Nos. 10-2007-0026168 and 10-2007-0026201 filed on Mar. 16, 2007, which is hereby incorporated by reference.

BACKGROUND

1. Field of the Disclosure

This document relates to an optical film and a display device having the same.

2. Description of the Background Art

A liquid crystal display (LCD) is an electronic device that changes various electrical information generated from various elements to visual information by using a change in a liquid crystal transmission and transfers it.

The general LCD comprises a liquid crystal panel that displays an image according to a drive signal and a data signal applied from an external source and a backlight unit disposed on a rear surface of the liquid crystal panel in order to illuminate the liquid crystal panel.

The backlight unit comprises a light source unit, a reflection sheet, and an optical film.

The light source generates light of a certain wavelength.

The reflection sheet reflects light that has not been made incident on the optical film, among light generated from the light source, to allow the light to proceed in the direction of the liquid crystal panel.

The optical film comprises a diffusion sheet, a prism sheet, and a protection sheet.

Light outputted toward the liquid crystal panel after being generated from the light source passes through the diffusion sheet. At this time, the diffusion sheet distributes the incident light, preventing the light from concentrating partially and making luminance uniform.

As the light passes through the diffusion sheet, its luminance is sharply degraded, so in order to prevent the degradation of the luminance, the prism sheet is used.

Figure 1:
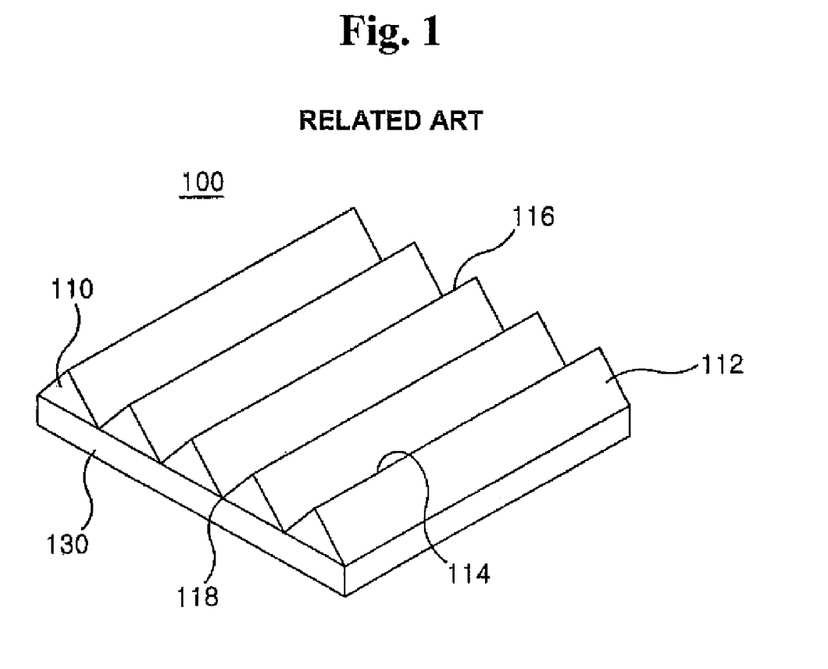
FIG. 1 is a perspective view showing the structure of the related art prism sheet.

FIG. 1 is a perspective view of the prism sheet according to the related art.

With reference to FIG. 1, the prism sheet 100 comprises a prism support unit 130 and a plurality of prism configuration parts 110 formed side by side on the entire surface of the prism support unit 130.

The prism configuration parts 110 comprise side parts each with a first side 112 and a second side 114 and substantially having an equilateral triangular shape when viewed from the front side. The angle between the first and second sides 112 and 14 is generally 90°, and may vary according to a selection.

As the plurality of prism configuration parts 110 are continuously formed on the prism support unit 130, there are formed valleys 118 and peaks 116 alternately. Light made incident on the prism support unit 130 of the thusly constructed prism sheet 100, it is refracted while passing through the prism configuration pails 110. Accordingly, the light made incident at the low angle is concentrated toward the front side, enhancing luminance within the range of an effective viewing angle.

However, when the prism configuration parts 110 of the related art prism sheet 100 contact with a smooth surface of a different optical film, a wet-out phenomenon occurs, damaging the optical film.

Moreover, a moiré phenomenon occurs due to interference of periodical patterns between pixels constituting the liquid crystal panel and the prism configuration parts 110 of the prism sheet 100, degrading the screen display capability.

SUMMARY OF THE DISCLOSURE

An aspect of this document is to provide a display device capable of reducing or removing a moiré phenomenon and a wet-out phenomenon.

In one aspect a display device comprises a display panel including a plurality of subpixels and an optical film disposed at one side of the display panel, the optical film includes a base film and a plurality of prisms, wherein a bias angle between a long axis direction of the subpixels and a longitudinal direction of the prisms is substantially 2 to 88 degrees.

In another aspect, an optical film comprises a base film having a side edge and a plurality of prisms disposed on the base film, wherein a bias angle between the side edge and a longitudinal direction of the prisms is substantially 2 to 88 degrees.

BRIEF DESCRIPTION OF THE DRAWINGS

The implementation of this document will be described in detail with reference to the following drawings in which like numerals refer to like elements.

DETAILED DESCRIPTION OF EMBODIMENTS

Reference will now be made in detail embodiments of the invention examples of which are illustrated in the accompanying drawings.

The detailed exemplary embodiments of the present invention will now be described with reference to the accompanying drawings.

As the display device according to one exemplary embodiment of the present invention, a liquid crystal display (LCD), a plasma display panel (PDP), an organic light emitting display (OLED), and the like may be applicable, and the LCD will be taken as an example in the below description for the sake of explanation. In this respect, however, the display device according to the exemplary embodiment of the present invention is not limited to the LCD.

Figure 2:
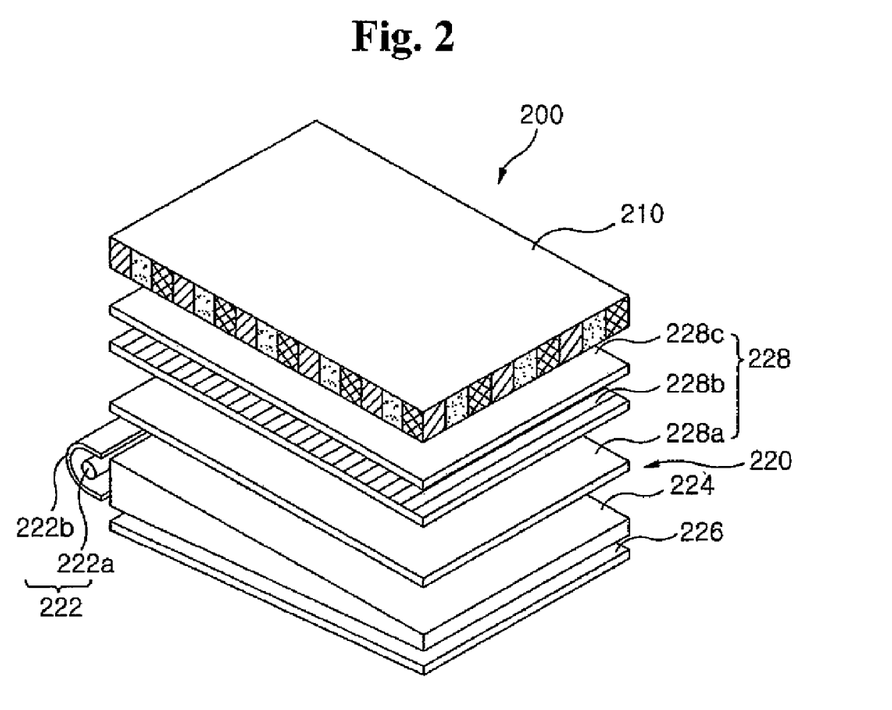
FIG. 2 is a perspective view showing a liquid crystal display according to one exemplary embodiment to which this document is applied.
Figure 3:
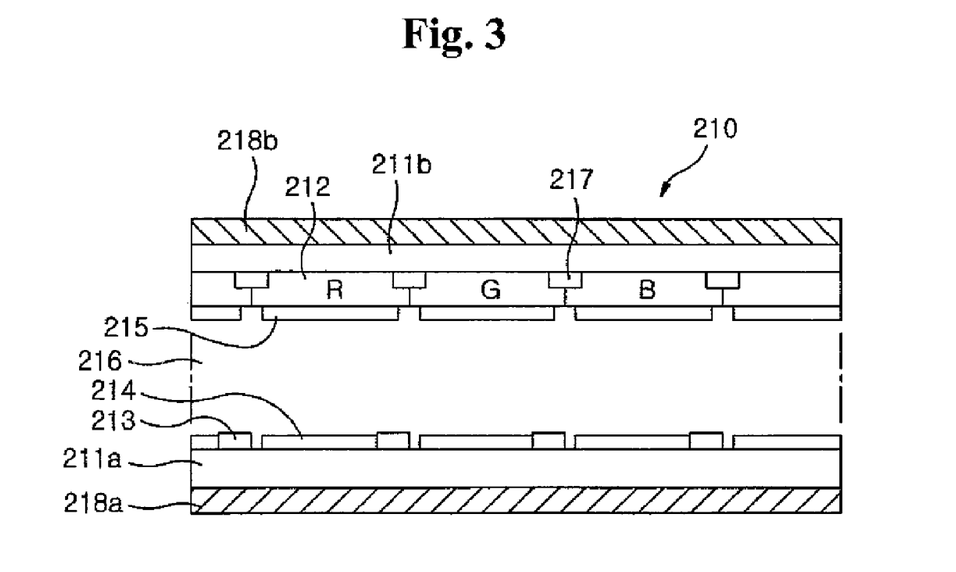
FIG. 3 is a sectional view showing a liquid crystal panel in FIG. 2.

FIG. 2 is a perspective view showing a liquid crystal display according to one exemplary embodiment to which this document is applied, and FIG. 3 is a sectional view showing a liquid crystal panel in FIG. 2.

With reference to FIGS. 2 and 3, the LCD 200 comprises a liquid crystal panel 210 that displays an image according to a driver signal and a data signal applied from an external source, and a backlight unit 220 disposed on a rear surface of the liquid crystal panel 210 in order to illuminate the liquid crystal panel 210.

The liquid crystal panel 210 comprises an upper substrate 211b, a lower substrate 211a, color filters 212, black matrixes 217, pixel electrodes 214, common electrodes 215, a liquid crystal layer 216, and TFT arrays 213. A pair of polarizers 218a and 218b are disposed on both sides of the liquid crystal panel 210.

The color filters 212 comprise a plurality of pixels each comprising red, green and blue subpixels, and when light is applied thereto, the color filters generate an image corresponding to the red, green, or blue.

In general, the pixels comprise the red, green, and blue subpixels, respectively, but without being limited thereto, red, green, blue, and white subpixels may constitute a single pixel and there may be various combinations.

The TFT arrays 213, switching elements, switch the pixel electrodes 214.

The common electrodes 215 and the pixel electrodes 214 change an arrangement of molecules of the liquid crystal layer 216 according to a certain voltage applied from the exterior.

The liquid crystal layer 216 comprises a plurality of liquid crystal molecules, and the arrangement of the liquid crystal molecules changes according to a voltage difference generated between the pixel electrodes 214 and the common electrodes 215. Light provided from the backlight unit 220 is made incident on the color fitters 212 according to the change in the arrangement of the molecules of the liquid crystal layer 216.

The backlight unit 220 is positioned on a rear surface of the liquid crystal panel 210 and provides light, e.g., white light, to the liquid crystal panel 210.

The backlight unit 220 may be divided into a direct type backlight unit in which a lamp is positioned below the liquid crystal panel and an edge-light type backlight unit in which a lamp is positioned at the side of a light guide plate, depending on an optical light (e.g., a CCFL (Cold Cathode Fluorescent Lamp)) installation method.

With reference to FIG. 2, the backlight unit 220 is driven according to an edge-light method, and comprises a light source unit 222, a light guide plate 224, a reflection sheet 226, and an optical film 228.

The light source unit 222 is positioned at the side of the backlight unit 220, and comprises a light source 222a and a lamp housing 222b.

The light source 222a is formed as an aggregate of multiple CCFLs that provide very bright white light.

Besides the CCFL, a light emitting diode (LED) or an external electric fluorescent lamp (EEFL) may be used as the light source 222a.

The LED may be formed with the red, green, or blue color or may be formed with a single color of white light. In case of the backlight unit 220 using the LED as the light source, the backlight unit 220 can become compact, light efficiency can be improved, and light uniformity can be maintained.

The EEFL has excellent luminance compared with the CCFL and is advantageous for being operated in parallel because its electrode exists outside. In particular, the EEFL can reduce the number of inverters compared with those required for the related art light source, so a unit cost based on the components and the weight of the LCD module can be reduced.

The lamp housing 222b allows the light source 222a to be mounted thereon and allows light emitted from the light source 222a to be made incident on the side of the light guide plate 224, to thus enhance light efficiency. For this purpose, the lamp housing 122b is made of a material with high reflexibility, and silver (Ag) may be coated on its surface.

The reflection sheet 226 is positioned below the light guide plate 224 and serves to reflect light emitted from the light source 222a toward the entire surface of the light guide plate 224.

The light guide plate 224 is designed such that after light is made incident on the side, total reflection is continuously made at below a threshold angle. Because the light source 222a is positioned at the side of the backlight unit 220, the light generated from the light source 222a is not uniformly on the entire surface of the backlight unit 220 but concentrated into the edge portions.

Thus, in order to uniformly transmit light to the entire surface, the light guide late 224 is required. The light guide plate 224 is typically made of a transparent acrylic resin such as poly methyl meta acrylate (PMMA). The PMMA has high strength, which thus is not easily broken or deformed, is light, and has a high visible ray transmittance.

The light guide plate 224 allows light to proceed toward the liquid crystal panel 210.

The optical film 228 may comprise, for example, a diffusion sheet 228a, a prism sheet 228b, and a protection sheet 228c.

Light outputted toward the liquid crystal panel 210 from the light guide plate 224 passes through the diffusion sheet 228a. The diffusion sheet 228a distributes the light made incident from the light guide plate 224, preventing the light from being partially concentrated, making luminance uniform, and widening a viewing angle.

When the light passes through the diffusion sheet 228a, its luminance sharply degrades. Thus, in order to prevent the degradation of luminance, the prism sheet 228b is used. The prism sheet 228b collects a portion of light diffused or collected by the diffusion sheet 228a toward the protection sheet 228c and reflects the remaining portion of the light toward the diffusion sheet 228a. The detailed construction of the prism sheet 228b will be described later.

The protection sheet 228c is positioned on the prism sheet 228b, prevents generation of scars on the prism sheet 228b, and widens the viewing angle which has been reduced by the prism sheet 228b.

Meanwhile, besides the above-described edge-light type backlight unit light can be also provided to the liquid crystal panel by using the direct type backlight unit.

Figure 4:
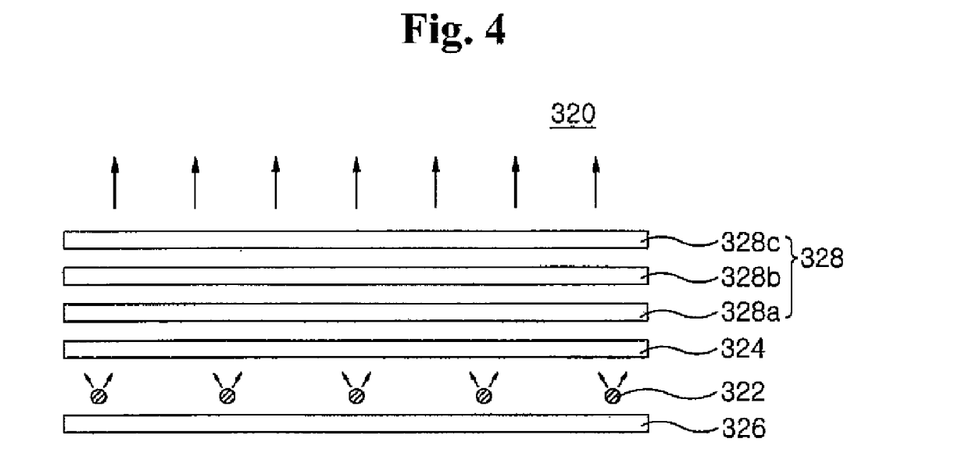
FIG. 4 is a sectional view showing a backlight unit according to another exemplary embodiment to which this document is applied.

FIG. 4 is a sectional view showing a backlight unit according to another exemplary embodiment to which this document is applied.

With reference to FIG. 4, the backlight unit 320 is driven according to the direct light method and comprises a light source 322, a diffusion plate 324, a reflection sheet 326, and an optical film 328.

The light source 322 is formed as a plurality of CCFLs aggregate. The CCFLs provide very bright white light.

Besides the CCFLs, the LCD or the EEFL may be used as the light source 322.

The reflection sheet 326 is positioned at a lower side of the diffusion plate 324 and serves to reflect light emitted from the light source 322 toward the entire surface of the diffusion plate 324.

Meanwhile, instead of the reflection sheet 326, a light source reflection plate (not shown) may be positioned at a lower side of the light source 322, the light source 322 may be mounted thereon, and light emitted from the light source 322 is made incident on the diffusion sheet 328a, thus improving light efficiency. The light source reflection plate is made of a material with high reflexibility, and silver (Ag) may be coated thereon.

The diffusion plate 324 allows light made incident from the light source 322 to pass therethrough. Preferably, the diffusion plate 324 is made of PMMA.

Unlike the edge-light type backlight unit, the direct type backlight unit 320 has such a structure that the plurality of light sources 322 are positioned at the lower portion of the liquid crystal panel 210, bright lines generated from the light source 322 appear with a certain pattern at an upper portion of the liquid crystal panel 210. The diffusion plate 324 has a certain pattern to serve to allow light to be transmitted therethrough while removing the bright lines generated from the light source 322. However, the backlight unit 320 according to the present exemplary embodiment may also use a diffusion plate that does not have a pattern.

The optical film 328 may comprise, for example, a diffusion sheet 328a, a prism sheet 328b, and a protection sheet 328c.

The light outputted toward the liquid crystal panel 210 from the diffusion plate 324 passes through the diffusion sheet 328a. The diffusion sheet 328a distributes the light made incident from the light guide plate 324, preventing the light from being partially concentrated and making luminance uniform.

When the light passes through the diffusion sheet 328a, its luminance sharply degrades. Thus, in order to prevent the degradation of luminance, the prism sheet 328b is used. The prism sheet 328b collects a portion of light diffused or collected by the diffusion sheet 328a toward the protection sheet 328c and reflects the remaining portion of the light toward the diffusion sheet 328a. The detailed construction of the prism sheet 328b will be described later.

The protection sheet 328c is positioned on the prism sheet 329b, prevents generation of scars on the prism sheet 328b and widens the viewing angle which has been reduced by the prism sheet 328b.

The illumination operation of the LCD 200 will now be described.

With reference to FIGS. 2 and 3, the backlight units 220 and 320 provide a plane light, white light, to the liquid crystal panel 210.

Subsequently, the TFT arrays 213 switch the pixel electrodes 214.

Successively, a certain voltage difference is applied between the pixel electrodes 214 and the common electrodes 215, and accordingly, the liquid crystal layer 216 is arranged to correspond to the red subpixels, the green subpixels, and the blue subpixels.

In this case, when the light provided from the backlight units 220 and 320 passes through the liquid crystal layer 216, the quantity of light is controlled, and the quantity-controlled light is provided to the color filters 212.

As a result, the color filters 212 implement an image with certain gray scales.

In detail, the pixels comprising the red subpixels, the green subpixels, and the blue subpixels implement a certain image according to combination of light which has passed through the red subpixels, the green subpixels, and the blue subpixels.

The optical films 228 and 328, in particular, the prism of the prism sheets 228b and 328b, will be described as follows.

Figure 5A:
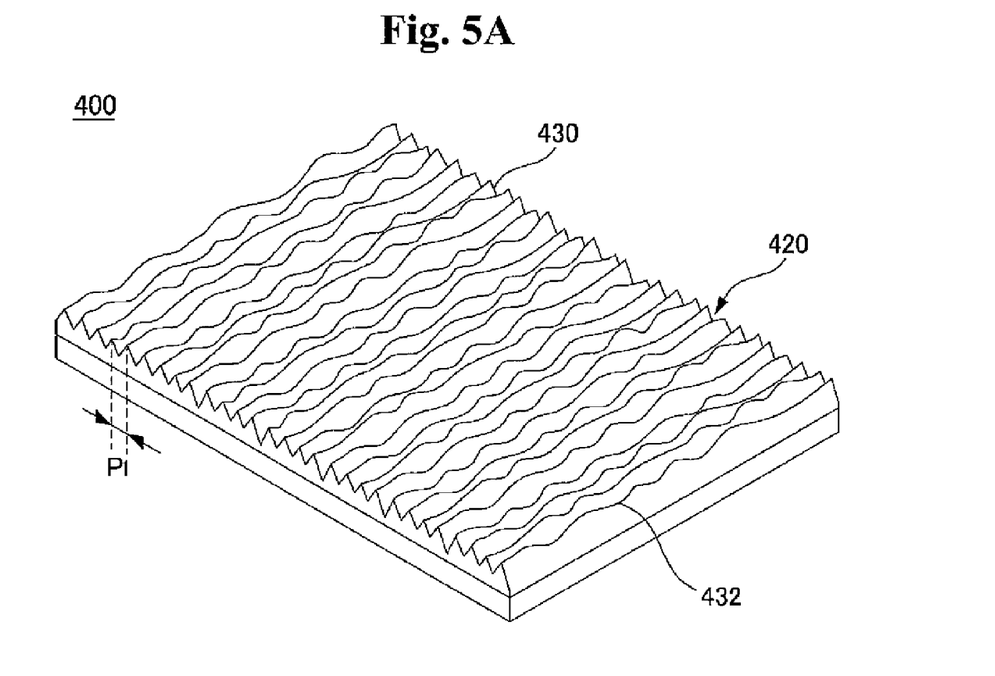
FIG. 5A is a perspective view schematically showing the structure of an optical film according to one exemplary embodiment to which this document is applied.
Figure 5B:
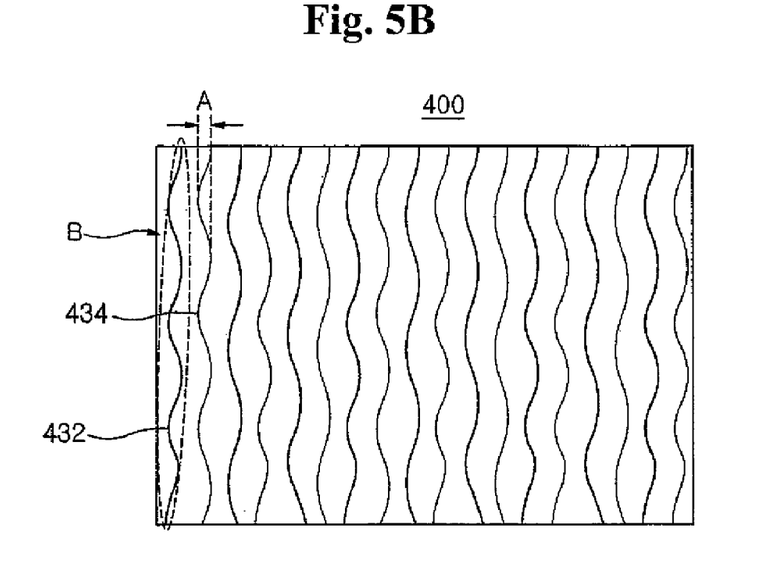
FIG. 5B is a plan view of the optical film in FIG. 5A.
Figure 5C:
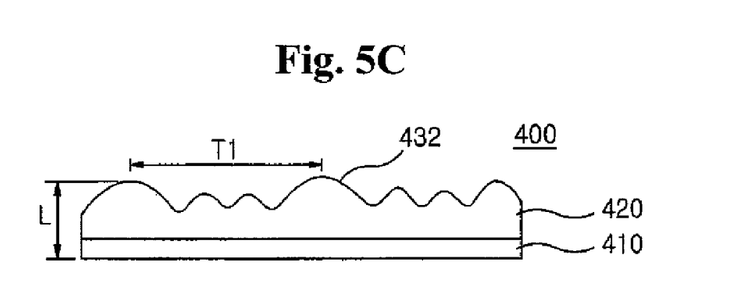
FIG. 5C is a side view of the optical film in FIG. 5A.

FIG. 5A is a perspective view schematically showing the structure of an optical film according to one exemplary embodiment to which this document is applied. FIG. 5B is a plan view of the optical film in FIG. 5A and FIG. 5C is a side view of the optical film in FIG. 5B.

With reference to FIG. 5A, the optical film 200 of the display device according to one exemplary embodiment of the present invention, for example, the prism sheets 228b and 328b, comprise a base film 410 and a plurality of prisms 420 formed on the entire surface of the base film 410. The plurality of prisms 420 comprises each prism 430, and each prism 430 are formed in a row to constitute the plurality of prisms 420.

One side of the optical film 400 is structured into the plurality of prisms 420 while the opposite side thereof is the base film 410 which is smoothly formed.

The base film 410 is preferably made of a thermoplastic polymer film which is transparent and flexible and has good processibility.

The plurality of prisms 420 are disposed side by side on the entire surface of the base film 410 and the peaks 432 and the valleys 434 of the plurality of prisms 420 form continuous bent portions.

One section of each prism 430 has a triangular shape. The pitch P1 between peaks 432 of the plurality of prisms 420 may be within the range of 20 μm to 300 μm.

Because side portions of each prism 430 are bent, light that transmits through the optical film 400 is refracted two-dimensionally.

With reference to FIG. 5B, the left and right portions of the peak 432 of each prism 430 change randomly in zigzags. The horizontal average amplitude (A) of the peak 432 of each prism 430 is within the range of about 1 μm to 20 μm.

With reference to FIG. 5C, when one peak 432 of each prism 430 is observed from the side, the height (L) of the peak 432 from the bottom changes periodically. For example, the average height difference (L) of the peaks ranges from about 1 μm to 20 μm, and the height of the peaks 432 changes with an average wavelength (T) of about 100 μm to 500 μm.

Herein, the peak height refers to the height of the peak.

The height (L) of the peak 432 of each prism 430 of the optical film 400 periodically changes, and the horizontal amplitude (A) of the peaks 432 changes randomly. Accordingly, such a defect generated as the peaks 432 of each prism 430 are crushed due to a physical contact with a different optical sheet (not shown) which comes in contact with an upper portion of the optical film 400 cannot be easily detected visually, so when the optical film 400 is employed for the backlight units 220 and 320, the picture quality of the LCD 200 cannot be affected.

In addition, the area of the physical contact with the different optical sheet (not shown) which comes in contact with the upper portion of the optical film 400 is reduced, the wet-out phenomenon can be reduced or removed.

Figure 6:
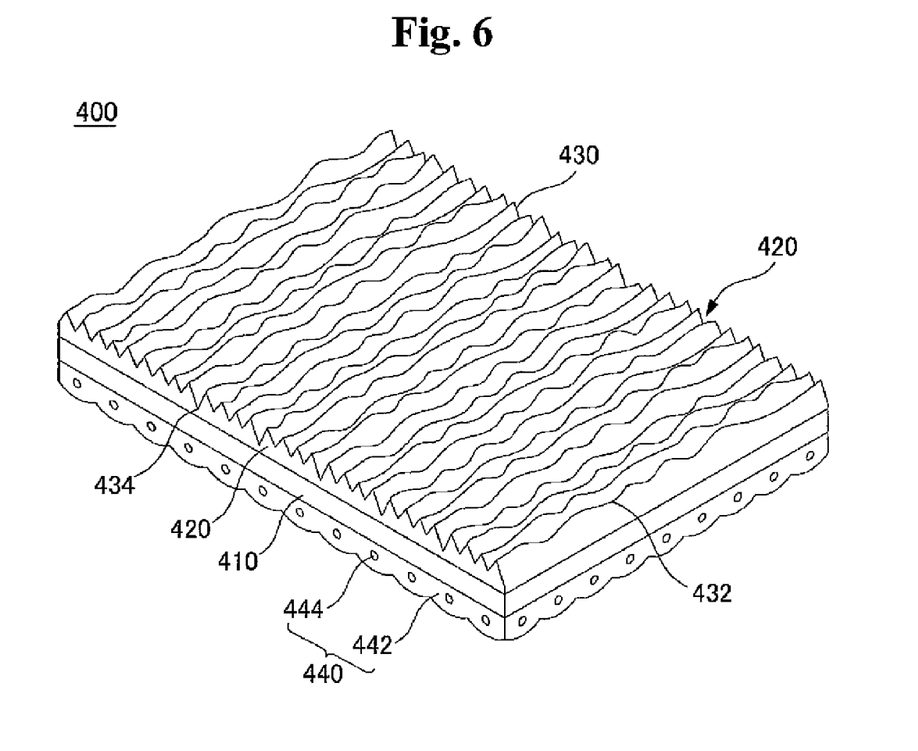
FIG. 6 is a perspective view schematically showing the structure of an optical film according to another exemplary embodiment to which this document is applied.

FIG. 6 is a perspective view schematically showing the structure of an optical film according to another exemplary embodiment to which this document is applied.

As shown in FIG. 6, the optical film of the display device according to another exemplary embodiment of the present invention may further includes a protection layer 440 comprising a plurality of beads at a lower portion of the base film 410.

The protection layer 440 improves heat resistance of the optical film 400.

In detail, the protection layer 440 comprises a resin base material 442 and the plurality of beads 444 distributed in the base material 442.

As the resin used for the base material 442, an acrylic resin which is transparent and has good heat resistance and mechanical characteristics may be used. The acrylic resin may be polyacrylate or PMMA.

The beads 444 may be formed by using a homogeneous or heterogeneous resin as that of the base material 442 and may be contained by 10 wt % to 50 wt % with respect to the base material 442. The weight ratio of the beads 444 to the base material 442 is 30 wt %.

The diameters of the beads 444 may be selectively determined suitably according to the thickness of the base film 410, and may be within the range of 1 μm to 10 μm.

In the present exemplary embodiment, the beads 444 have the substantially same diameters and are regularly distributed in the base material 442. When the beads 444 with the substantially same diameters are regularly distributed in the base material 442, a haze effect may be reduced but the luminance increases.

In a different embodiment of the present invention, the beads 444 may have various different diameters and may be irregularly distributed in the base material 442. In this case, the haze effect would increase, increasing the effect that a defect such as scratches generated due to a physical contact is reflected as it is on the liquid crystal panel 210 is prevented.

In addition, the protection layer 440 serves to prevent the optical film 400 from being deformed by heat generated from the light sources 222a and 322. That is, the optical film 400 would not be creased owing to the base material 442 with the high heat resistance, and even if the optical sheet 400 is deformed at a high temperature, it has such a good force of restitution as to be restored to its original state at a room temperature.

The protection layer 440 also serves to prevent the optical film 400 from having scars due to an external impact or other physical forces.

The other surface of the protection layer 440 may be a matte surface.

Figure 7:
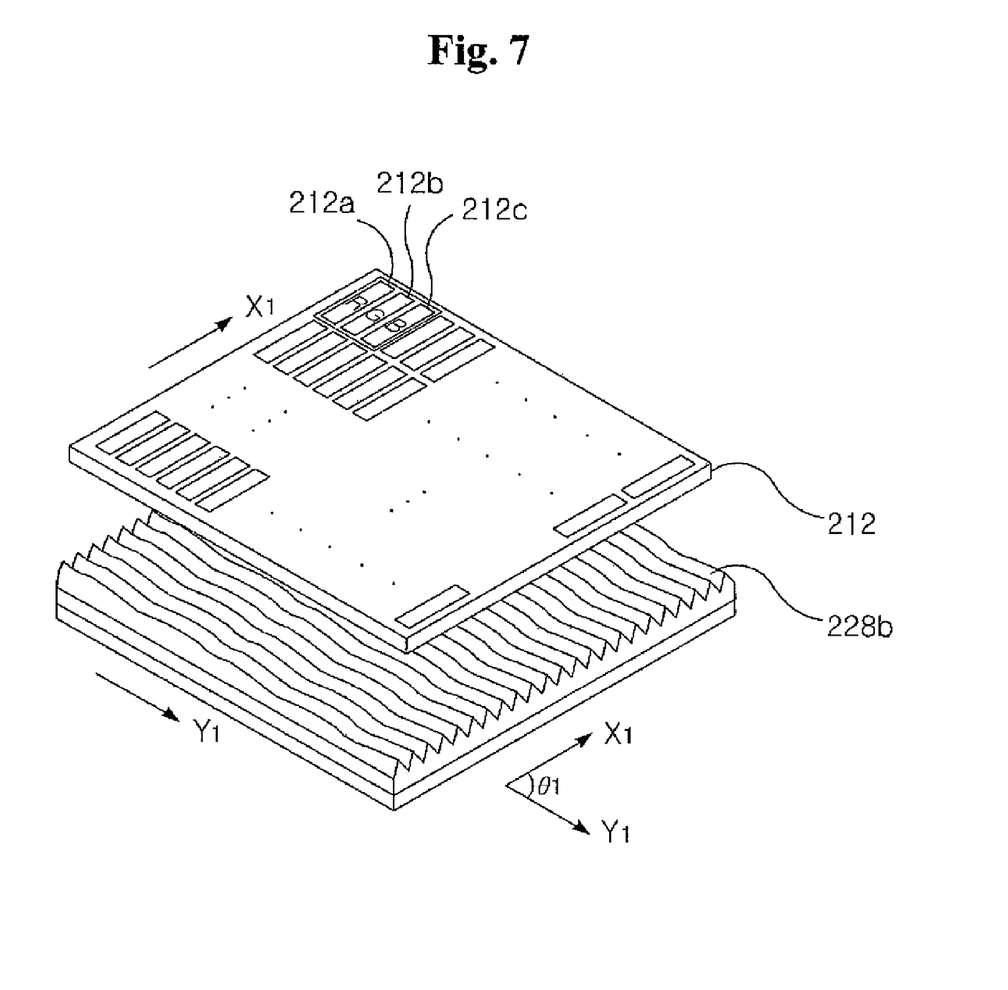
FIG. 7 is a perspective view showing a disposition relationship between the liquid crystal panel and the optical film according to one exemplary embodiment of the present invention.
Figure 8:
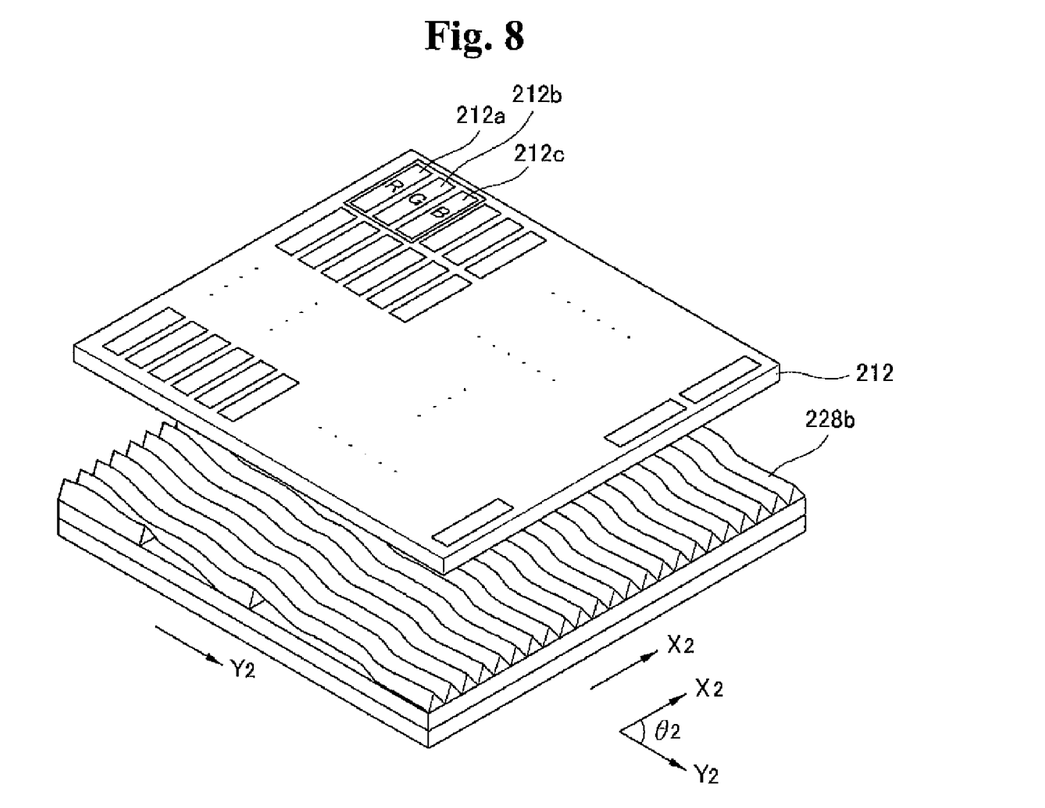
FIG. 8 is a perspective view showing a disposition relationship between the liquid crystal panel and the optical film according to another exemplary embodiment of the present invention.

FIG. 7 is a perspective view showing a disposition relationship between the liquid crystal panel and the optical film according to the exemplary embodiment of the present invention, FIG. 8 is a perspective view showing a disposition relationship between the liquid crystal panel and the optical film according to another exemplary embodiment of the present invention.

Specifically, FIG. 7 shows only the color filter 212 and the optical film, namely, the prism sheet 228b (referred to as 'optical film', hereinafter) merely for the sake of brevity. As a matter of course, the prism sheet 228b has such a structure as that of the optical films 400 or 500 as described above.

With reference to FIG. 7, as afore-mentioned, in the color filter 212, the red subpixel 212a, the green subpixel 212b, and the blue subpixel 212c constitute a single pixel. The thusly configured pixels are disposed with a periodical pattern to constitute the single color filter 212.

The optical film 228b comprises a plurality of prisms with each prism periodically arranged.

The periodical pattern of the color filter 212 and the periodical arrangement of the optical film 228b may cause generation of moiré. The moiré refers to interference fringes generated when two or more periodical patterns overlap.

In order to avoid the moiré phenomenon, as shown in FIG. 7, the LCD 200 of the display device according to the exemplary embodiment of the present invention is formed such that the long axis direction (X1) of the red, green, and blue subpixels 212a, 212b, and 212c of the color filter 212 and the longitudinal direction (Y1) of the prism of the optical film 228b are disposed to cross each other at a predetermined bias angle (θ1).

As shown in FIG. 8, the display device according to the exemplary embodiment of the present invention is formed so that a side edge (X2) of the base film and the longitudinal direction (Y2) of the prism of the optical film 228b are disposed at a predetermined bias angle (θ2).

The side edge (X2) of the base film extends in a direction substantially parallel to the long axis direction.

The bias angle (θ1, θ2) may be within the range of about 2° to 88°. Preferably, it ranges from 50° to 88°. More preferably, the bias angle (θ1, θ2) is within the range of about 2° to 40°.

Simulation evaluating the characteristics of the LCD 200 will be described as follows.

TABLE 1

| | Prism pitch | Bias angle | External defect | Generation degree of moiré |
|---|---|---|---|---|
| Embodiment 1 | 20 μm | 88° | None | Very good |
| Embodiment 2 | 20 μm | 70° | None | Very good |
| Embodiment 3 | 20 μm | 50° | None | Good |
| Embodiment 4 | 20 μm | 40° | None | Good |
| Embodiment 5 | 20 μm | 20° | None | Good |
| Embodiment 6 | 20 μm | 2° | None | Good |
| Embodiment 7 | 50 μm | 88° | None | Very good |
| Embodiment 8 | 50 μm | 70° | None | Very good |
| Embodiment 9 | 50 μm | 50° | None | Good |
| Embodiment 10 | 50 μm | 40° | None | Good |
| Embodiment 11 | 50 μm | 20° | None | Good |
| Embodiment 12 | 50 μm | 2° | None | Good |

With reference to [Table 1], in embodiment 1 to embodiment 6, an optical film with a prism pitch (P) 20 μm was used, and in embodiment 7 to embodiment 12, an optical film with a prism pitch (P) 50 μm was used.

In the LCD according to embodiment 1 and embodiment 7, the bias angle (θ1, θ2) between the long axis direction (X1) of the red, green, and blue subpixels of the color filter or the side edge (X2) of the base film and the longitudinal direction (Y1, Y2) of the prism of the optical film was 88°. The bias angle (θ1, θ2) in the LCD according to embodiment 2 and the embodiment 8 was 70°, that in the LCD according to embodiment 3 and embodiment 9 was 50°, that in the LCD according to embodiment 4 and embodiment 10 was 40, that in the LCD according to embodiment 5 and 11 was 20°, and that in the LCD according to embodiment 6 and embodiment 12 was 2°.

Of the optical films of all the exemplary embodiments of the present invention, the average height difference (L) of the peaks of each prism was 2 μm and the average wavelength (T) was 150 μm. The color filter in which red, green, and blue subpixels constitute one pixel was used.

The external defect and the generation degree of moiré of the LCD according to embodiment 1 to embodiment 12 were checked.

The external defect and the more phenomenon were checked according to whether or not a defect of the optical film was visually detected from a screen of the LCD and the generation degree of each phenomenon was checked. The existence or nonexistence of the defect was determined based on the average eyesight of ordinary people.

According to the determining results, as noted in [Table 1], no visual external defect was detected from the optical films according to embodiment 1 to embodiment 12 and a wet-out phenomenon was within tolerance. This owes to the fact that the peaks of the prisms of the optical films are formed with the bent portions randomly or periodically.

In addition, the moiré phenomenon was not generated, or little if ever, in the LCD according to embodiment 1 to embodiment 12. This owes to the fact that there is the difference in the height of the peaks of the optical films and the subpixels of the color filter or the side edge of the base film and the prism of the optical film were disposed to be inclined at the bias angle ($\theta 1$, $\theta 2$). In particular, it was confirmed that the moiré phenomenon was prevented more effectively in the LCD according to the embodiments 1, 2, 7, and 8 in which the bias angle ($\theta 1$, $\theta 2$) was within the range of about 88° to 70°.

The display device according to the exemplary embodiments of the present invention, because the optical film and the display panel are disposed at a particular angle, the moiré phenomenon can be reduced or removed, and a defect generated due to the contact with other optical sheet member is not visually detected from outside.

In addition, because the height of peaks of the prisms is different, a contact is with other optical sheet member can be reduced, and thus, the wet-out phenomenon can be reduced or removed.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A display device, comprising:
   a display panel including a plurality of subpixels; and
   an optical film disposed at one side of the display panel, the optical film including:
   a base film; and
   a plurality of prisms,
   wherein a bias angle between a long axis direction of the subpixels and a longitudinal direction of the prisms is substantially 2 to 88 degrees.

2. The display device of claim 1, wherein the bias angle is substantially 2 to 40 degrees.

3. The display device of claim 1, wherein the bias angle is substantially 50 to 88 degrees.

4. The display device of claim 1, wherein the peak heights of the prisms vary along the longitudinal direction of the prisms.

5. The display device of claim 4, wherein the peak heights of the prisms randomly vary along the longitudinal direction of the prisms.

6. The display device of claim 4, wherein the peak heights of the prisms periodically vary along the longitudinal direction of the prisms.

7. The display device of claim 1, wherein the average difference of the peak heights of the prisms is substantially 1 µm to 20 µm.

8. The display device of claim 1, wherein the pitch between the peaks of the prisms is substantially 20 µm to 300 µm.

9. The display device of claim 1, wherein the average wavelength of the peaks of the prisms is substantially 100 µm to 500 µm.

10. The display device of claim 1, further comprising a protection layer disposed on one surface of the optical film,
    wherein the protection layer comprises a plurality of beads and the diameters of the plurality of beads are substantially 1 µm to 10 µm.

11. The display device of claim 1, wherein the average horizontal amplitudes of the peaks of the prisms randomly vary.

12. The display device of claim 11, wherein the average amplitudes of the peaks of the prisms are substantially 1 µm to 20 µm.

13. An optical film, comprising:
    a base film having a side edge; and
    a plurality of prisms disposed on the base film,
    wherein a bias angle between the side edge and a longitudinal direction of the prisms is substantially 2 to 88 degrees.

14. The optical film of claim 13, wherein the bias angle is substantially 2 to 40 degrees.

15. The optical film of claim 13, wherein the bias angle is substantially 50 to 88 degrees.

16. The optical film of claim 13, wherein the peak heights of the prisms vary along the longitudinal direction of the prisms.

17. The optical film of claim 16, wherein the peak heights of the prisms randomly vary along the longitudinal direction of the prisms.

18. The optical film of claim 16, wherein the peak heights of the prisms periodically vary along the longitudinal direction of the prisms.

19. The optical film of claim 13, wherein the average difference of the peak heights of the prisms is substantially 1 µm to 20 µm.

20. The optical film of claim 13, wherein the pitch between the peaks of the prisms is substantially 20 µm to 300 µm.

21. The optical film of claim 13, wherein the average wavelength of the peaks of the prisms is substantially 100 µm to 500 µm.

22. The optical film of claim 13, further comprising a protection layer disposed on one surface of the optical film,
    wherein the protection layer comprises a plurality of beads and the diameters of the plurality of beads are substantially 1 µm to 10 µm.

23. The optical film of claim 13, wherein the average horizontal amplitudes of the peaks of the prisms randomly vary.

24. The optical film of claim 23, wherein the average amplitudes of the peaks of the prisms are substantially 1 µm to 20 µm.

* * * * *